United States Patent [19]

Fisher

[11] Patent Number: 5,537,241
[45] Date of Patent: Jul. 16, 1996

[54] TELECOMMUNICATIONS SYSTEM

[75] Inventor: David A. Fisher, Saffron Waldon, Great Britain

[73] Assignee: Northern Telecom Limited, Montreal, Canada

[21] Appl. No.: 562,083

[22] Filed: Nov. 15, 1995

Related U.S. Application Data

[63] Continuation of Ser. No. 152,279, Nov. 12, 1993, abandoned.

[30] Foreign Application Priority Data

Nov. 12, 1992 [GB] United Kingdom .................. 9223746
Jun. 22, 1993 [GB] United Kingdom .................. 9312909

[51] Int. Cl.⁶ .......................... H04J 14/08; H04B 10/00
[52] U.S. Cl. .................... 359/137; 359/110; 359/136; 359/158; 359/167
[58] Field of Search ...................... 359/110, 135, 359/136, 137, 158, 167, 168

[56] References Cited

U.S. PATENT DOCUMENTS

| | | | |
|---|---|---|---|
| 5,063,595 | 11/1991 | Ballance | 359/152 |
| 5,278,690 | 1/1994 | Vella-Coleiro | 359/158 |
| 5,327,277 | 7/1994 | Van der Plas et al. | 359/158 |
| 5,341,365 | 8/1994 | Clarke | 359/110 |
| 5,357,360 | 10/1994 | Imhoff et al. | 359/137 |

FOREIGN PATENT DOCUMENTS

| | | | |
|---|---|---|---|
| 0163311 | 12/1985 | European Pat. Off. | 371/8.1 |
| 0272916 | 11/1990 | Japan | 340/825.01 |
| 9317506 | 9/1993 | WIPO | 455/103 |

*Primary Examiner*—Leo Boudreau
*Assistant Examiner*—Bhavesh Mehta
*Attorney, Agent, or Firm*—Lee, Mann, Smith, et al.

[57] ABSTRACT

Error-free or rapid protection switching between two basestations, one main and one standby, or two transmitters (1,2) etc. of one basestation (8) is achieved using a downstream marshalling scheme involving the transmission of a sequence from the standby basestation to an outstation (9,10,11) at levels below the noise sensitivity of a receiver (7) at the outstation and alignment of the phases of the transmitted sequence and a reference main basestation sequence by, for example, a correlation process. If a similar upstream marshalling process is employed for marshalling additional outstations into the system the same circuitry can be used for phase alignment for both marshalling processes. (FIG. 1).

9 Claims, 2 Drawing Sheets

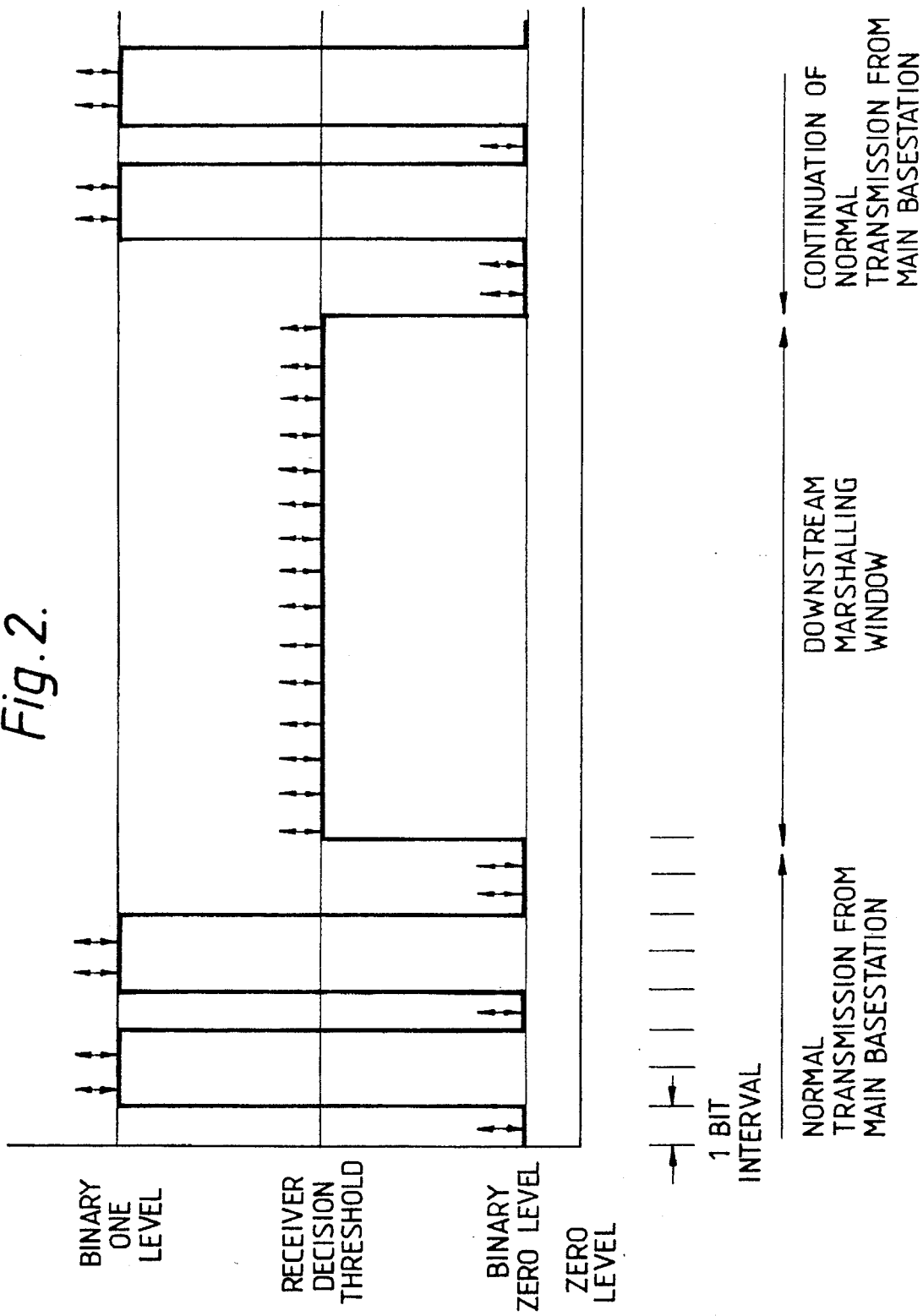

TELECOMMUNICATIONS SYSTEM

This application is continuation of application Ser. No. 08/152,279, filed Nov. 12, 1993, now abandoned.

This invention relates to telecommunications systems and in particular to systems employing the time division multiplex/time division multiple access (TDM/TDMA) principle.

BACKGROUND OF THE INVENTION

The TDM/TDMA principle is well known in radio systems or passive optical networks (PONs), where it is employed to permit transmission between a single basestation and a plurality of outstations. In the downstream (basestation to outstation) direction, the information (traffic) is broadcast to all outstations, but upstream it is transmitted in bursts, each of which must be timed to avoid mutual interference (overlap) so that at any time the basestation only receives data from one outstation.

In our co-pending GB Applications 931291 1.2 and 9312910.4 (D A Fisher 10-2-1 and D A Fisher 11-3) there are described time division multiple access frame alignment techniques for use in marshalling the transmission from newly connected outstations without interfering with existing traffic transmissions. The basic method of these applications comprises employing pseudo random sequences at a level below the noise sensitivity of the base station receiver (for normal traffic). These sequences can be detected using correlation and their phase is used to determine the loop delay to the new outstation. A sequence generator is required at the outstation, and a reference generator is required at the basestation for correlation process. This is an upstream marshalling technique. The present invention is concerned with protection of the basestation.

SUMMARY OF THE INVENTION

According to the present invention there is provided a method of enabling error free or rapid protection switching between two basestations, a main basestation and a standby basestation, in a telecommunications system, which method employs a downstream marshalling scheme involving the transmission of a sequence from the standby basestation to an outstation at levels below the noise sensitivity of a receiver at the outstation and alignment of the phases of the transmitted sequence and a reference main basestation sequence in advance of switching between standby operation and main operation.

It is thus proposed to use an extension of a downstream marshalling technique in order to provide seamless protection i.e. enable switching from one basestation to another. A downstream window can be used to capture samples. Initial alignment to the nearest bit can be achieved using exactly the same circuitry as for upstream marshalling. Samples can be stored at the outstations and processed thereat or at a basestation. Duplicated traffic routes can be phase aligned either by allowing the marshalling technique to achieve it or, alternatively, if the phase discriminator of the marshalling system is modified to give an indication of the phase difference, alignment can be obtained more quickly.

The method may be applied to a burst mode system in which the downstream and upstream directions may share the same optical fibre and transmit in bursts so that at no time is a transmitter and receiver pair at an outstation or basestation transmitting at the same time, and in respect of marshalling sequences upstream and marshalling sequences may be concurrent and continuous but orthogonal in nature or neither process will be concurrent in which case orthogonality is not required.

BRIEF DESCRIPTION OF THE DRAWINGS

Embodiments of the invention will now be described with reference to the accompanying drawings in which:

FIG. 2 illustrates the optical signal at the receiver.

DESCRIPTION OF PREFERRED EMBODIMENT

Figure 1:
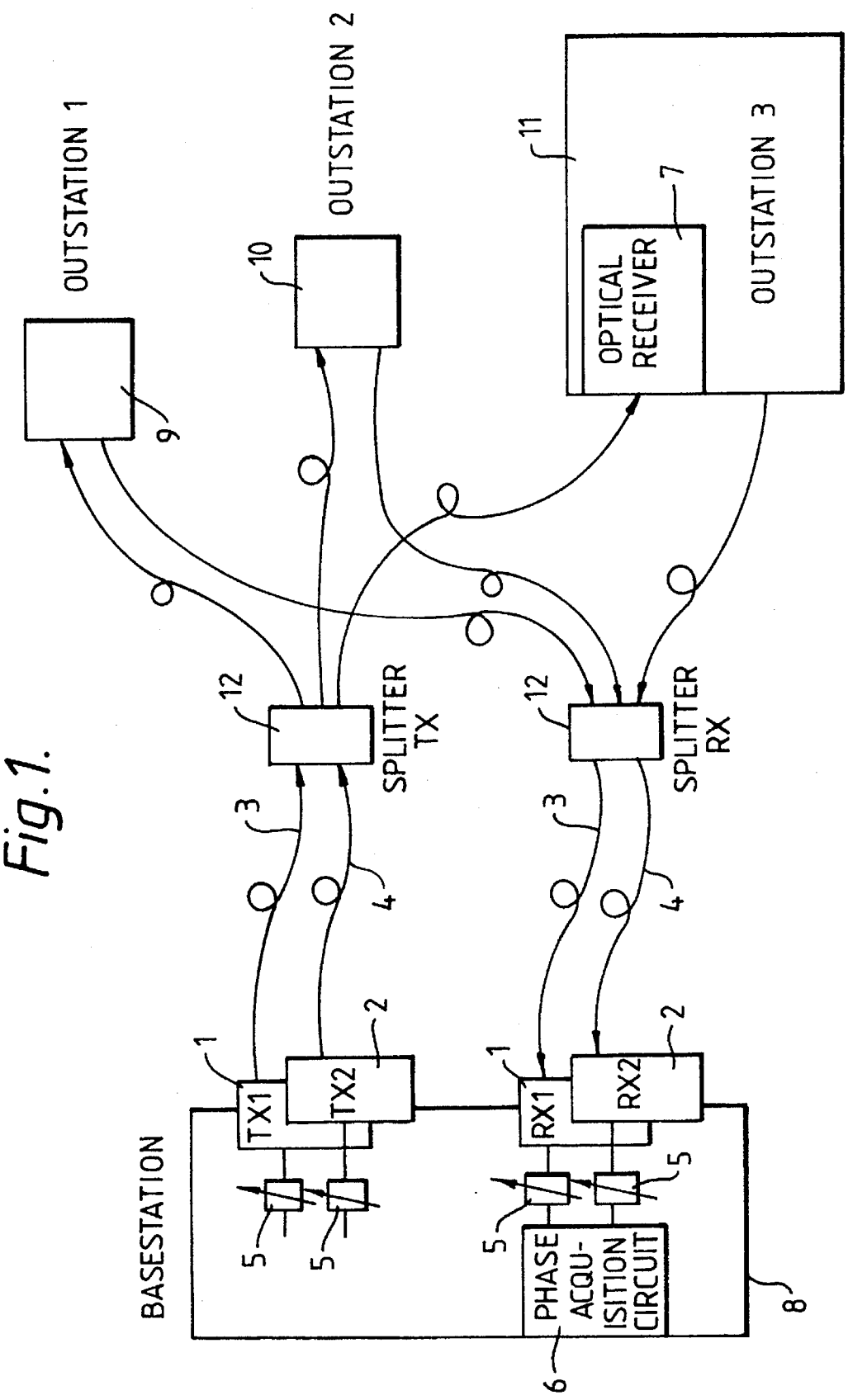
FIG. 1 illustrates a PON network.

The network illustrated in FIG. 1 comprises a basestation 8 and three outstations 9, 10 and 11. Outstation 11 is drawn more explicitly than outstations 9 and 10 but all three are identical. This basic PON network and its function and the upstream marshalling technique is described in greater detail in the first above-mentioned co-pending application. The present invention is described hereinafter with reference to a PON network but it should be understood that it is equally applicable to a radio network or a twisted pair of coaxial cable network operating on TDMA principles.

The passive optical splitter 12 which includes a transmitter and receiver parts splits the signal out of a single transmitter e.g. TX1(1) into several receivers e.g. receiver 7 of outstation 11 so that the basestation 8 can be carrying all of the traffic for everybody connected to it. With 32 outstations this can be up to six or seven hundred circuits, since each outstation can carry of the order of thirty channels. Hence quite often it is necessary to protect the basestation by duplicating it. For the case where the basestation electro-optical components have been duplicated as 1 and 2 the splitters 12 will be unchanged but there are now two fibres 3 and 4 running to it rather than just fibre 3. There is a need to be able to switch from one basestation transmitter 1 to the other transmitter 2 and for this it is necessary for them to be perfectly synchronous and of similar amplitude, which would be the case if the fibres were exactly the same length and had the same loss. In practice this is not possible and thus some means is required to align their phases such as by means illustrated as variable delays 5. One way of doing this is to align the delays of the two fibres so that a receiver at an outstation can be switched instantaneously from one transmitter to the other, i.e. one basestation to the other, so that operation can be continuous i.e. one transmitter is a hot standby transmitter. This can be achieved using a marshalling process with one (main) transmitter operating all the time. There is a small window in the downstream TDM frame structure of the main transmitter which is used for messaging but which is unused most of the time, and this window can be used to capture samples, alternatively a fixed window in the downstream frame may be reserved. The standby basestation transmitter also transmits a low level transmission, which transmissions are similar to those described in the above-mentioned co-pending application as output by the outstation, which any of the outstations can receive and may store values (samples) of and possibly perform local processing on. However since the cost of a basestation is amortised over all the outstations it is preferable to perform all the processing at the basestation end of the system. The outstation stored values can be sent to the basestation for processing using a dedicated channel or shared upstream channel, and processed by exactly the same circuitry that would be used for upstream marshalling as described in detail in the above-mentioned applications and thus by using the same techniques you can adjust the phase of the transmitted signal from one basestation to the nearest bit at least, to be the same as the other basestation. Having done that it is necessary to adjust the phase to within a bit for which there are three possible techniques. Technique 1 does not employ the marshalling process to achieve this since once the basestations have been switched over the phase acquisition circuit 6 would acquire phase relatively quickly. Technique 2 uses the phase discriminator in the optical receiver of the outstation 7 modified to give an indication of exactly the phase difference between the phase of normal transmission and the phase of the offset one, for example by observing the location of zero crossings in a short burst of 10101010 traffic sent from the standby transmitter at normal amplitude, and if that is known the phase of the offset one can be modified so as to exactly align the phase and position in the frame of both of them. The third technique employs the coefficients of the correlators integrating the standby basestation transmission. Hence phase alignment of duplicated traffic routes i.e. hot standby switchover is achieved. This is an extension of the marshalling technique of the above mentioned applications to allow hot standby protection switching without any error introduction.

Aspects of the downstream marshalling system used to obtain hot standby switchover will now be described in greater detail.

The amplitude of the low level transmitter sequence from the standby basestation must be relatively small compared to that of the main basestation transmission, in order that there is a negligible effect on the ability of an outstation to receive the main basestation transmission free of error. For example, a rate of approximately 10:1 in optical power is sufficient to meet this condition, although a greater ratio may be employed. Consequently during the downstream marshalling window in which the main transmitter output is temporarily suspended, in order for the outstation to be able to detect the standby transmitted sequence, it is necessary for the outstation receiver threshold to be at the centre of the standby transmitter signal deviation. In order to achieve this it is necessary either to provide a special receiver design in which the outstation receiver threshold during the downstream marshalling window is able to adjust to the mean level of the signal during the window, or to design the main and standby transmitters in such a way as to allow this condition to be met. In a passive optical network employing this technique, it is advantageous to modify the transmitter rather than a multiplicity of receivers. This also allows the outstation receiver design to be entirely conventional, having a threshold recovery circuit that is adjusted to the mean of the optical data signal, which is normally binary. The method and means for achieving the requirement is as follows. Attention is directed to FIG. 2 in this respect.

During the downstream marshalling window, the main transmitter is set to approximately the half power level. An optical transmitter conventionally transmits at full power for a binary one and reduced power for a binary zero. The binary zero power is often that corresponding to the laser bias level, in which the laser is driven by a bias current, whilst the binary one level is determined by being driven by the bias current and a drive current. Thus to obtain half power the bias current is not altered but the drive current is halved. During the marshalling window, the optical signal received at each outstation will consist of the half power level of the main base station transmission, with the much lower standby transmitter sequence superimposed on it. This is illustrated in FIG. 2. The double headed arrows indicate the deviation of the received signal from the main transmitter due to the standby transmitter. In FIG. 2 the receiver decision threshold is a little too low, since the threshold during the downstream marshalling window is not at the centre of the deviation and is unlikely to produce any binary zeros.

In order to allow for the tolerance in the receiver decision threshold determined from the received signal, for deviation in the relationship between the laser drive current and output power, and tolerance in the laser drive circuit, a further technique for adjustment of the drive current of the main transmitter during the downstream marshalling window may be necessary. This takes the form of a control loop in which the ratio of ones and zeros received during the downsteam marshalling window is determined and the transmitter drive current adjusted until this balances, this assuming equal probability of the number of ones and zeros in the standby correlation sequence. The mechanism for returning the outstation received data to the basestation may employ a part of the PON TDMA upstream frame from that outstation, one method being to share the upstream messaging channel using the data received during a downstream marshalling window in place of a null message content. Since the correlation process operates over several thousand samples, the loss of some of these samples does not affect the function, but will increase the overall acquisition time.

The outstation receiver design is thus conventional and operation during the downstream marshalling window is thus no different from that elsewhere in the downstream frame, the sampled part of the downstream marshalling window may consist of only 8 bits of information, with a period of 16 bits either side to allow for the main transmitter to be switched from full to half power and half to full power, plus a short sequence of normal power alternating one/zero transmission prior to and after the marshalling window to ensure timing recovery circuits remain in good alignment in respect of the main transmitter.

In the downstream marshalling method the main and standby transmitters will be given the same frame synchronisation reference information in order that the relative delay between the main transmission sequence to the outstation, which will contain framing information, for example in the form of a CRC in a fixed position, and the correlation sequence position can be used to determine the required standby transmitter transmit time. In order to determine the required transmit phase angle for the standby transmitter (phase angle being defined as the fraction of a transmitted bit) in addition to the delay in bits between the two paths (main to receiver and standby to receiver), employing technique 3 referred to earlier it is sufficient to determine the correlation coefficients of two correlators spaced one bit apart in respect of the reference sequence. If the standby transmitted sequence is not an exact number of data bits (in delay terms e.g. 1 bit at 50MHz represents a delay of 20 nanoseconds representing a differential transmission distance of 4 metres) then the sampled sequence will be comprised of samples in which components from the two adjacent bits from the standby transmitter exist. Conversely, each element transmitted by the standby transmitter will have a component in two adjacent receiver samples. When averaged (integrated) over sufficient received bits, the ratio of the adjacent correlation coefficients will give the degree of offset of the bit boundary. This may be adjusted by means of an adjustable tapped delay line at the standby transmitter until there is no overlap of coefficients. The outstation receiver in the conventional case will detect a binary one or binary zero, hence if the phase error relative to the bit boundary is small, the larger signal component will dominate and potentially totally obscure the smaller signal component, preventing the assessment of the ratios of adjacent correlator coefficients. Where the received standby is comparable with or smaller than transmitter correlation sequence level is comparable with the noise level of the receiver, this limiting effect will not apply. However if this is not the case, an alternative is to deliberately adjust the phase of the standby transmitted sequence to generate equal components in adjacent samples. When the standby transmitter is switched to become the main transmitter, the required phase angle and bit offset is applied.

During standby operation, once the relative position of the transmitter has been found, short bursts of normal amplitude data may be transmitted in the marshalling window to enable verification and full power adjustment of the standby transmitter.

I claim:

1. A method of enabling error free or rapid protection switching between a main base station and a standby base station serving a plurality of outstations in a time division multiple access (TDMA) telecommunications system in which downstream traffic from the main base station to said outstations is transmitted in frames and in which each said outstation has means for receiving a binary sequence, said receiving means having a decision threshold whereby to distinguish one and zeros in that binary sequence, the method including providing each said frame with a window within which transmission of data from the main base station is temporarily suspended and within which the main base station transmission Dower level is reduced to approximately one half transmitting from said standby base station to a said outstation during each said window a reference binary sequence having an amplitude that is small relative to the main base station transmission, said reference sequence being a pseudo-random sequence and being superimposed on the main base station transmission, determining at the outstation the relative numbers of binary ones and zeros detected in the reference sequence and adjusting the power of the main base station transmitter relative to the decision threshold of the outstation receiving a means so that the relative numbers of ones and zeros detected in the reference sequence by the receiving means are substantially equal, determining at the outstation from the timing of said reference sequence relative to the timing of the main base station transmissions the magnitude of a phase difference between the main base station and the standby base station transmissions, and adjusting the timing of the standby base station such that transmissions from both base stations received at the outstation are in phase.

2. A method as claimed in 1, wherein the phase alignment is achieved by a correlation process.

3. A method as claimed in claim 2, Wherein in the telecommunications system additional outstations are introduced into the system by transmitting from each additional outstation a respective reference sequence at a level below the noise sensitivity of a receiver of the base station, detecting said respective reference sequence at the base station, discriminating the phase of the detected respective reference sequence and using the discriminated phase to determine a loop delay to the additional outstation.

4. A method as claimed in claim 3, wherein the sequence from the additional outstation and its phase are detected by a correlation process.

5. A method as claimed in claim 2, wherein the main and standby transmitters are given identical frame synchronisation information and the relative delay between the main transmitter sequence and a correlation sequence is used to determine the required standby transmitter transmit time.

6. A method as claimed in claim 1, wherein the main and standby base stations each include a respective transmitter which is transmitting continuously, the base station acting as a main base station at a particular point in time transmitting at a higher power than the base station acting as a standby base station at that time.

7. A method as claimed in claim 6, wherein the ratio of transmitted powers of the main and standby base stations is of the order of 10:1.

8. A method as claimed in claim 7, wherein the telecommunications system is a passive optical network (PON) system and wherein the transmitters are optical sources.

9. A method as claimed in claim 8 applied to a burst mode system in which the downstream and upstream directions may share the same optical fibre and transmit in bursts so that at no time is a transmitter and receiver pair at an outstation or at a base station transmitting at the same time.

\* \* \* \* \*